United States Patent
Feng et al.

(10) Patent No.: US 8,873,263 B2
(45) Date of Patent: Oct. 28, 2014

(54) DUAL-INPUT 18-PULSE AUTOTRANSFORMER RECTIFIER UNIT FOR AN AIRCRAFT AC-DC CONVERTER

(75) Inventors: Frank Z. Feng, Loves Park, IL (US); Mustansir Kheraluwala, Lake Zurich, IL (US); Waleed M. Said, Rockford, IL (US); John Huss, Roscoe, IL (US)

(73) Assignee: Hamilton Sunstrand Corporation, Windsor Locks, CT (US)

( * ) Notice: Subject to any disclaimer, the term of this patent is extended or adjusted under 35 U.S.C. 154(b) by 289 days.

(21) Appl. No.: 13/449,116

(22) Filed: Apr. 17, 2012

(65) Prior Publication Data

US 2013/0272040 A1   Oct. 17, 2013

(51) Int. Cl.
*H02M 5/14*   (2006.01)

(52) U.S. Cl.
USPC ............................. 363/143; 363/45; 363/153

(58) Field of Classification Search
CPC .................... H02M 5/14; H02M 5/10
USPC ................... 363/148–149, 153–155, 143, 45
See application file for complete search history.

(56) References Cited

U.S. PATENT DOCUMENTS

| 5,386,147 | A  | * | 1/1995  | Bonneau et al. ................ 307/64 |
| 5,512,811 | A  |   | 4/1996  | Latos et al. |
| 6,118,362 | A  |   | 9/2000  | Tinkler et al. |
| 6,861,736 | B2 |   | 3/2005  | Lee et al. |
| 7,005,840 | B2 |   | 2/2006  | Cester |
| 7,274,280 | B1 |   | 9/2007  | Paice |
| 7,750,782 | B1 | * | 7/2010  | Paice ............................. 336/12 |
| 7,813,147 | B2 |   | 10/2010 | Blanchery |
| 2007/0063708 | A1 |   | 3/2007  | Baker |
| 2007/0086125 | A1 |   | 4/2007  | Baker |
| 2008/0130320 | A1 | * | 6/2008  | Bruzy et al. ...................... 363/5 |
| 2008/0165553 | A1 | * | 7/2008  | Swamy ........................... 363/67 |
| 2008/0285314 | A1 |   | 11/2008 | Kojori |
| 2011/0051480 | A1 | * | 3/2011  | Blanchery ..................... 363/154 |

* cited by examiner

*Primary Examiner* — Harry Behm
(74) *Attorney, Agent, or Firm* — Carlson, Gaskey & Olds, P.C.

(57) ABSTRACT

A dual-input 18-pulse autotransformer rectifier unit for more electric aircraft AC-DC converter uses an autotransformer with a nine-phase output to condition AC power prior to DC rectifying the AC power.

15 Claims, 6 Drawing Sheets

U S 8,873,263 B2

DUAL-INPUT 18-PULSE AUTOTRANSFORMER RECTIFIER UNIT FOR AN AIRCRAFT AC-DC CONVERTER

TECHNICAL FIELD

The present disclosure is related generally to aircraft electric power systems, and particularly to a light weight dual-input nine-phase eighteen-pulse Autotransformer Rectifier Unit for a More Electric Aircraft AC-DC Converter.

BACKGROUND OF THE INVENTION

Modern aircraft include generators that generate power during flight and provide the generated power to onboard aircraft electric power systems. The generators utilize rotation of the aircraft engine to generate AC power using known power generation techniques. Power generated in this manner is typically 230V 400 Hz AC power. While the aircraft is on ground, aircraft engines can be turned off, the onboard generator ceases generating power, and the onboard electric system instead receives AC power from a ground cart. Power provided from the ground cart is typically 115V 400 Hz AC power.

While the power sources provide AC power, aircraft components often require DC power instead of AC power. AC-DC power conversion may be accomplished with a plurality of diode pairs, where each pair is connected to a different phase of the AC input, to provide a rectified DC output. However, this type of AC-DC conversion leads to substantial current harmonics that pollute the electric power generation and distribution system. To reduce current harmonics, multi-phase autotransformers are employed to increase the number of AC phases supplied to the rectifier unit. For example, in an 18-pulse passive AC-DC converter the autotransformer is used to transform the three-phase AC input, whose phases are spaced at 120°, into a system with nine phases spaced at 40°. This has the effect of reducing the harmonics associated with the AC-DC conversion.

SUMMARY OF THE INVENTION

Disclosed is a passive AC-DC converter having an autotransformer. The autotransformer has a plurality of first high voltage AC inputs, a plurality of second low voltage AC inputs, a winding topology having a plurality of windings corresponding to each of multiple phases, the plurality of windings configured such that the autotransformer generates an 18-pulse AC input current waveform, and a set of autotransformer outputs. The passive AC-DC converter further includes a bridge rectifier connected to the set of autotransformer outputs and a DC output from the bridge rectifier.

These and other features of the present invention can be best understood from the following specification and drawings, the following of which is a brief description.

DETAILED DESCRIPTION

Figure 1:
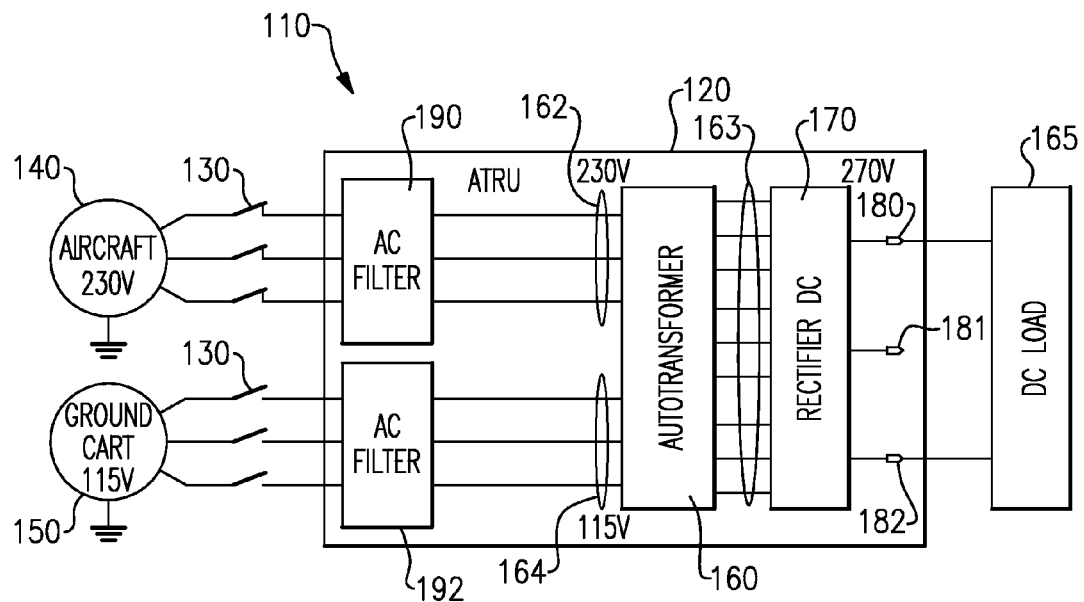
FIG. 1 illustrates a nine-phase Autotransformer based AC-DC Converter in an aircraft electric power system context.

FIG. 1 illustrates a power conversion system 110 for use in an aircraft electric power system. The power conversion system 110 includes a passive AC-DC converter 120 that accepts either a three-phase 230V AC input 140 from a 230V aircraft power source or a three-phase 115V AC input 150 from a 115V ground-cart power source and provides power to a DC load 165 via a DC+ connection 180, a DC− connection 182, and a 0V connection 181. The passive AC-DC converter 120 includes an autotransformer 160 that accepts three phase AC inputs 162, 164 and provides a nine phase AC output 163 to a rectifier 170. The DC outputs 180, 181, 182 are connected to the rectifier 170. The particular power source 140, 150 connected to the passive AC-DC converter 120 is controlled by a set of break-before-make switches 130 on each input line 162, 164. Each input 162, 164 is also filtered by a corresponding AC filter 190, 192.

Figure 2:
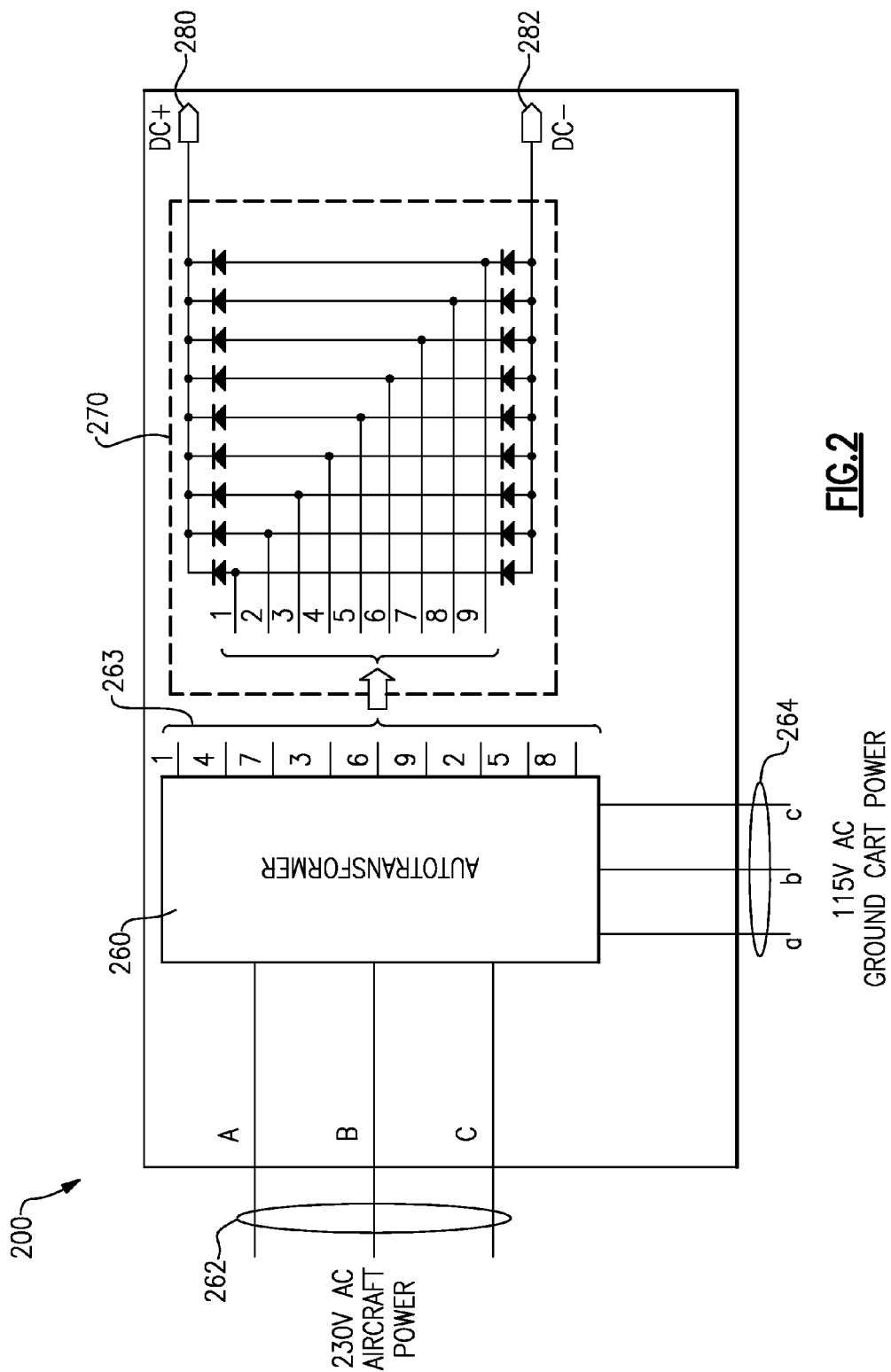
FIG. 2 illustrates dual-input nine-phase 40° phase shift autotransformer connected to a nine-phase rectifier unit.
Figure 2B:
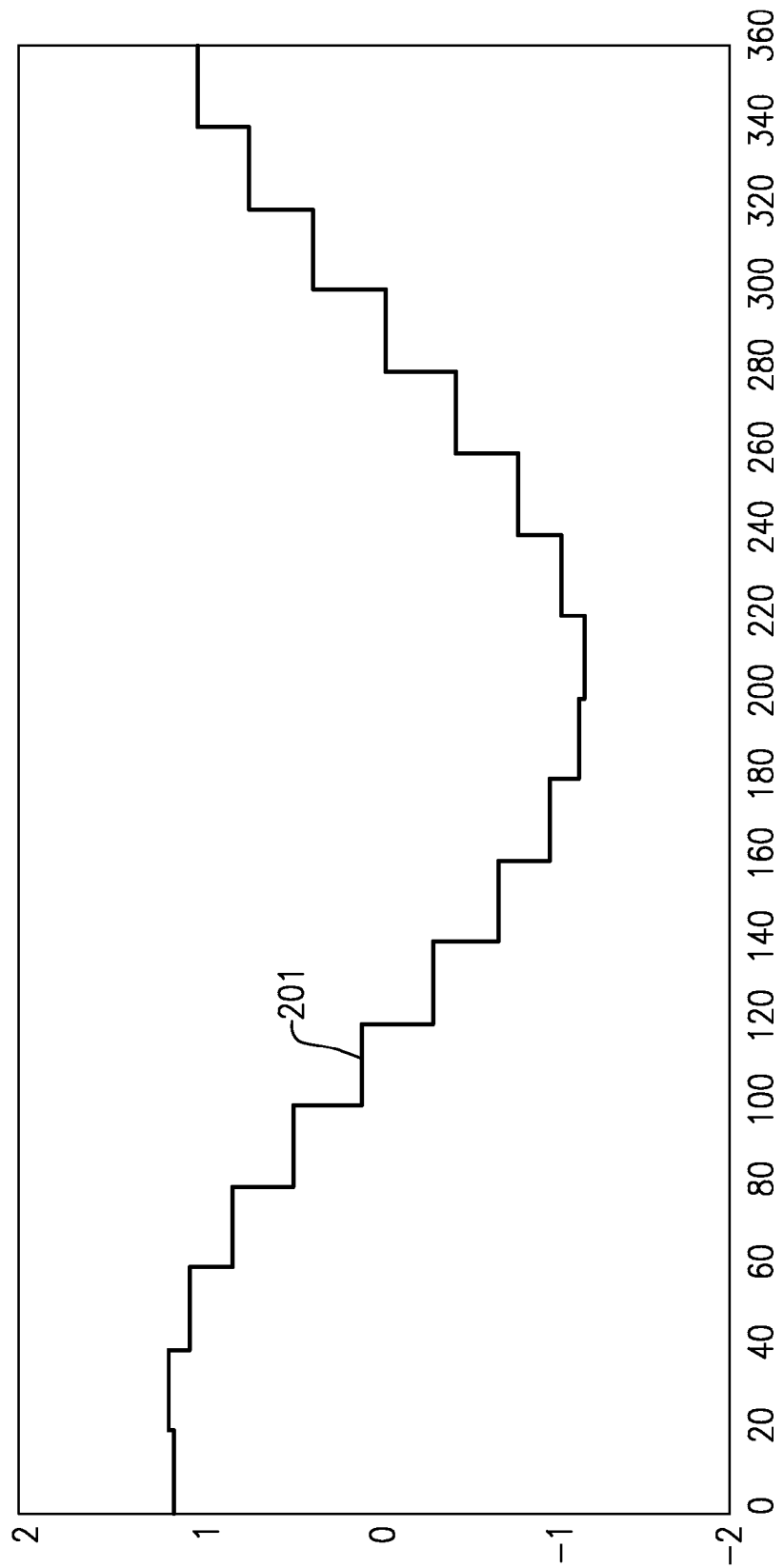
FIG. 2(b) is an 18-step waveform closely approximating a desired sine-wave.

FIG. 2 illustrates an example passive AC-DC converter 200 that can be used as the AC-DC converter 120 of FIG. 1. Within the passive AC-DC converter 200, an autotransformer 260 accepts either the three-phase voltage input 262, or the three-phase voltage input 264. The passive AC-DC converter 200 converts either input 262 or 264 to a nine-phase AC output 263. The nine-phase AC output 263 is rectified to DC voltage by a rectifier 270. The rectifier 270 provides a DC+ output 280 and a DC− output 282. The DC+ and DC− outputs 280, 282 provide power to a power bus that distributes DC power to onboard aircraft components. The autotransformer 260 nine-phase output currents are square-wave, and the three-phase input current is an 18-step waveform 201 closely approximating a desired sine-wave (illustrated in FIG. 2(b)). The illustrated 18-step waveform 201 is presented for explanatory purposes and certain features, steps or other elements of the waveform are increased or decreased for illustrative effect.

In order to utilize a single passive AC-DC converter 200 for both the 230V AC power input 262 and the 115V AC power input 264 and maintain a constant DC output voltage, the autotransformer 260 further includes a 115V input to 230V step up when a 115V input 264 is connected. This step up ensures that a constant DC voltage output is provided from the DC outputs 280, 282 regardless of whether 115V AC source 264 or 230V AC source 262 is connected. 230V AC voltage is then stepped down by a ratio of γ, where 1≥γ≥0.5. DC output voltage 265 is proportional to step down ratio γ, and a designer can select step down ratio γ to meet a particular DC output voltage requirement. Thus, the autotransformer 260 nine-phase output 263 is γ×230V for either a 230V AC input 140 or a 115V AC input 150. Since the nine-phase output 163, 263 is independent of the particular selected AC input 140, 150 (illustrated in FIG. 1), the rectifier output 280 and 282 is also independent of the particular selected inputs 140, 150. Furthermore, the kVA rating of the autotransformer 160, 200 is $$\frac{46.7\%}{\gamma},$$

where γ is the autotransformer step down ratio and where 1≥γ≥0.5.

Further referring to FIG. 2, the autotransformer AC output current waveform at pin 1 is pulsed, with high harmonic current contents. The output at pin 2 is also pulsed with a 40° phase shift relative to the output of pin 1. The same applies to outputs of pins 3, 4, 5, 6, 7, 8, and 9. The autotransformer 260 synthesizes the nine output pulsed current waveforms into an 18-step current waveform that closely approximates a desired sinewave current at 230V AC input 262 A, B and C, and similarly at 115V AC input 264a, b and c. Undesirable harmonic currents at nine-phase outputs 263 are cancelled through the autotransformer 260.

Figure 3:
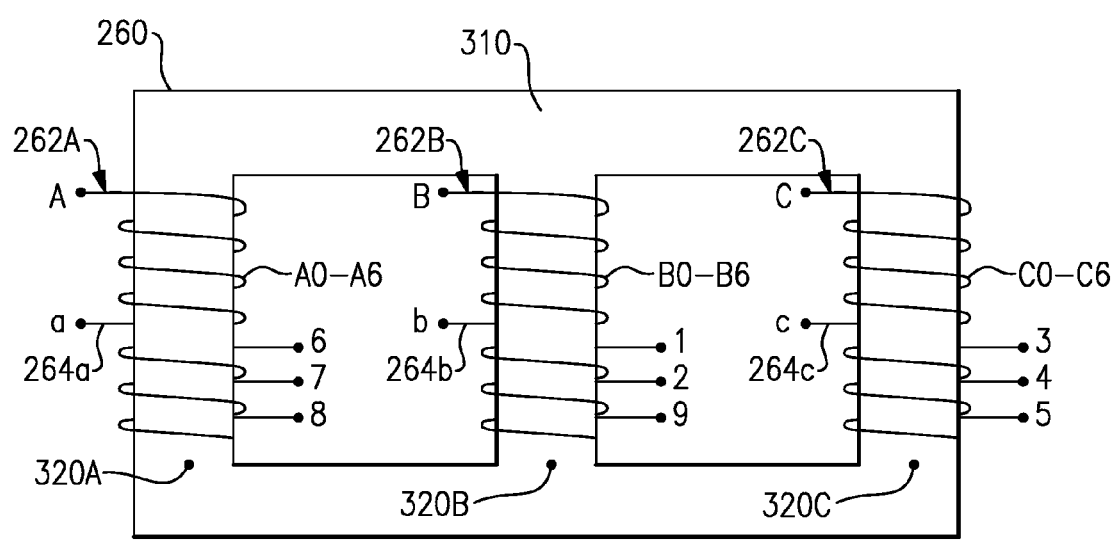
FIG. 3 illustrates autotransformer core and winding configuration.

FIG. 3 schematically illustrates the autotransformer 260. The autotransformer 260 has a three-legged core 310, with physical windings A0-A6, B0-B6, and C0-C6 wound respectively about the three core legs, 320A, 320B, and 320C. The 230V 3-phase AC inputs 262A, B, C are located on each phase leg, as well as the 115V 3-phase AC inputs 264a, b, c. Outputs 1-9 output nine-phase power from the autotransformer 260.

Figure 4A:
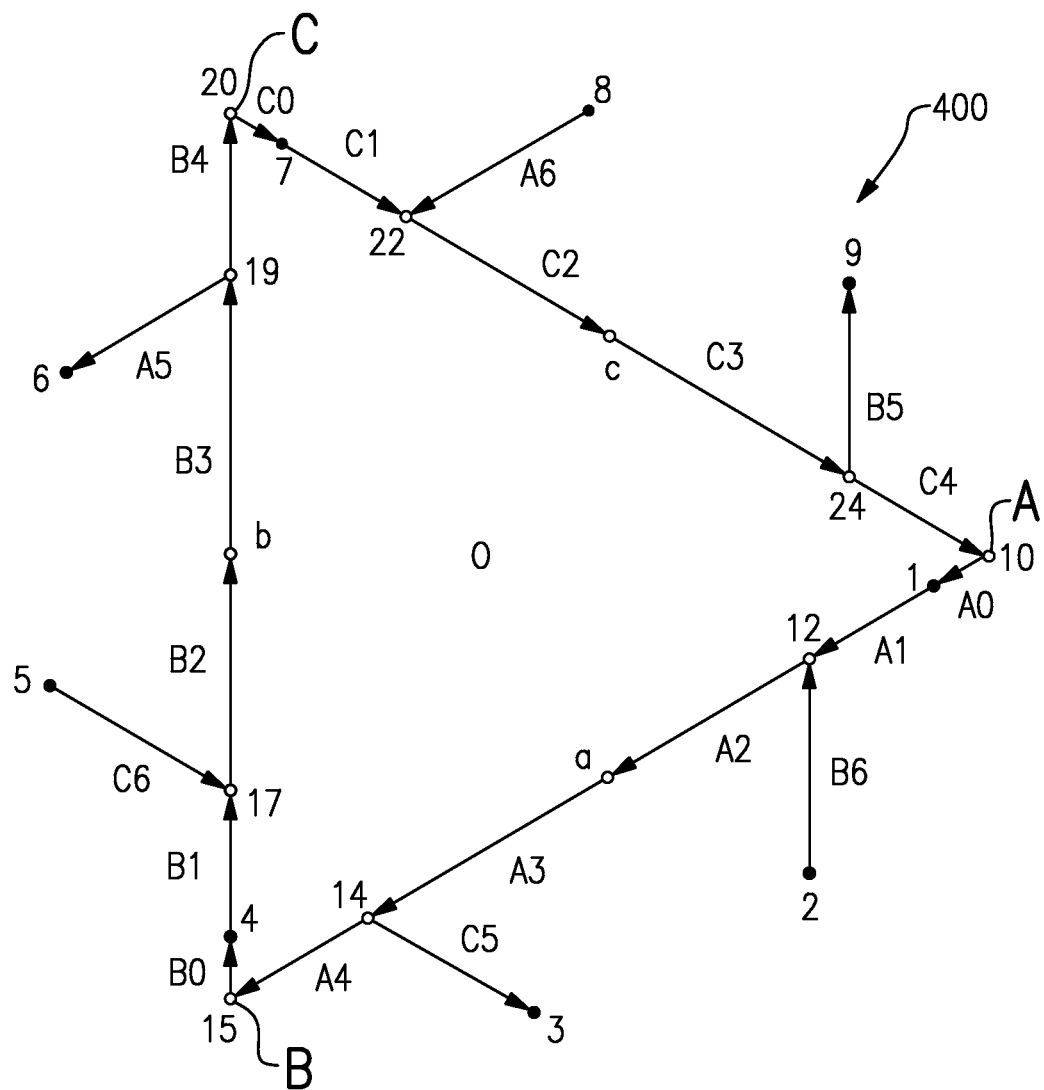
FIG. 4A illustrates 21-vector diagram representing the physical windings of a nine-phase autotransformer.
Figure 4B:
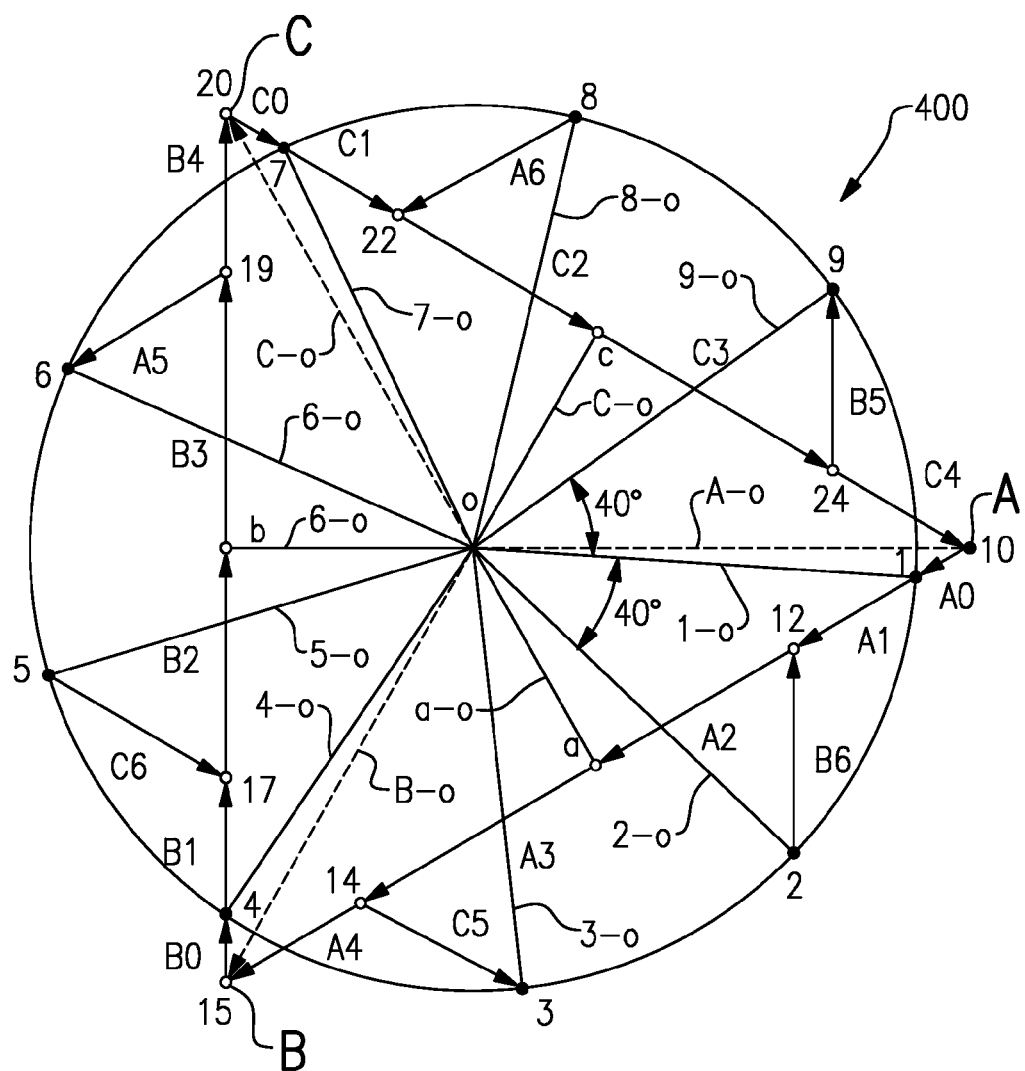
FIG. 4B illustrates the 21-vector diagram of FIG. 4A with the added illustration of resultant vectors.

With continued reference to FIGS. 2 and 3, FIG. 4A illustrates a vector diagram 400 of the physical windings A0-A6, B0-B6, C0-C6 of an example autotransformer 260 from the example AC-DC converter illustrated in FIG. 2 with step down ratio γ=0.9. FIG. 4B illustrates the vector diagram of FIG. 4A with the added illustration of resultant vectors. The arrow length of each winding A0-A6, B0-B6, C0-C6 is proportional to the number of winding turns, and the arrow points from the start of the winding to the finish of the same winding. The three 230V AC input voltage vectors are represented by drawing straight lines from A, B and C to triangle center o, to form A-o, B-o, and C-o. The three 115V AC input voltage vectors are represented by drawing straight lines from a, b and c to triangle center o, to form a-o, b-o, and c-o. Nine output voltage vectors are represented by drawing straight lines from points 1 through 9 to triangle center o, to form nine output voltage vectors 1-o, 2-o, 3-o, 4-o, 5-o, 6-o, 7-o, 8-o, and 9-o. The ratio of the length of vector 1-o to the length of vector A-o is the autotransformer output voltage step down ratio γ from 230V, where γ=0.9. The ratio of the length of vector A-o to the length of vector a-o is 2, the fixed voltage ratio of 230V and 115V AC inputs. The phase angle from 1-o to 2-o is 40°, and the angle from 1-o to 9-o is also 40°. The phase angle from 4-o to 3-o is 40°, and the phase angle from 4-o to 5-o is 40°. Similarly, the phase angle from 7-o to 6-o is 40°, and the phase angle from 7-o to 8-o is 40°. As illustrated, all winding segments A0-A6, B0-B6, and C0-C6 drawn as parallel to each other are on a shared phase leg of the autotransformer core 310 in FIG. 3. The phase legs 320A, B, C of the three legged autotransformer core 310 receive windings A0-A6, B0-B6, and C0-C6 respectively.

The nine AC power output connections 1, 2, 3, 4, 5, 6, 7, 8, and 9 are illustrated as solid circles, and provide a nine-phase output to the rectifier 270, illustrated in FIG. 2. The 230V AC inputs 262 illustrated in FIG. 2 are connected to the autotransformer 260 at connection points A, B, and C. The 115V AC inputs 264 of FIG. 2 are connected to the autotransformer 260 at connection points a, b, and c. Connection points a, b, and c connect the 115V input to the autotransformer 260, such that the autotransformer 260 steps up the AC input 264 to an equivalent 230V AC before the desired step down, γ, resulting in a consistent nine-phase AC output voltage regardless of which of the two inputs 262, 264 is connected to its respective 230V AC or 115V AC source.

In addition to the winding polarity of the winding segments A0-A6, B0-B6, C0-C6, the number of winding turns of A0-A6, B0-B6 and C0-C6 is normalized to that of A0, B0, C0. It should be understood that the turns ratio between the various winding segments A0-A6, B0-B6, C0-C6 is determined by the step down ratio γ. In the illustrated example of FIGS. 4A and 4B, the autotransformer 260 steps down the 230V AC input, such that the AC output of the autotransformer 260 is γ=0.9 of the 230V AC input. To achieve this step down, the normalized number of turns are: A0 is 1 turn, A1 is 1.690 turns, A2 is 4.668 turns, A3 is 3.926 turns, A4 is 3.433 turns, A5 is 3.572 turns, and A6 is 3.177 turns. The number of turns on each of the winding segments B0-B6 and C0-C6 are correspondingly identical to those of A0-A6.

While the particular example winding segments of FIG. 4 are illustrated with a step down ratio of 0.9 (90%) (the nine AC output voltages are 90% of the AC input voltage at A, B and C), a worker of skill in the art would be able to adapt the vector diagram disclosed above to achieve a different step down ratio using the same principles as 0.9 step down example. By way of example, a person of skill in the art could utilize the above teachings to adjust the turns ratios to achieve varied step down ratios to achieve 1≥γ≥0.5 for step down application.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A passive AC-DC converter comprising:
   an autotransformer, wherein said autotransformer comprises:
      a plurality of first high voltage AC inputs;
      a plurality of second low voltage AC inputs;
      a winding topology having a plurality of windings corresponding to each of multiple phases, said plurality of windings configured such that said autotransformer generates an 18-pulse AC input current waveform, said winding topology having a plurality of phase legs, each phase leg comprising a first winding segment having a turn ratio of 1, a second winding segment having a turn ratio of 1.690, a third winding segment having a turn ratio of 4.668, a fourth winding having a turn ratio of 3.926, a fifth winding segment having a turn ratio of 3.433, a sixth winding segment having a turn ratio of 3.572, and a seventh winding segment having a turn ratio of 3.177, for a step down ratio of 0.9; and
      a set of autotransformer outputs;
   a bridge rectifier connected to said set of autotransformer outputs; and
   a DC output from said bridge rectifier.

2. The passive AC-DC converter of claim 1, wherein said set of autotransformer outputs comprises a nine phase AC output.

3. The passive AC-DC converter of claim 2, wherein said nine-phase AC output is configured such that an approximately sinusoidal current is drawn through said autotransformer from said plurality of first AC inputs or said plurality of second AC inputs.

4. The passive AC-DC converter of claim 2, wherein said autotransformer further comprises a plurality of winding segments on each of multiple phase legs of said autotransformer, and wherein each of said plurality of winding segments has a turn ratio normalized to a designated winding segment on said phase leg.

5. The passive AC-DC converter of claim 4, wherein each of said phase legs comprises a low voltage input corresponding to one input of said plurality of second inputs, wherein said low voltage input is connected to a junction between winding segments on said phase leg.

6. The passive AC-DC converter of claim 5, wherein each of said low voltage inputs is configured to step up said low voltage input to an expected voltage of a corresponding high voltage input.

7. The passive AC-DC converter of claim 4, wherein said plurality of winding segments on each phase leg of said autotransformer are configured such that each corresponding output of said nine-phase output is a stepped down voltage relative to an expected AC voltage of said high voltage input.

8. The passive AC-DC converter of claim 7, wherein said stepped down voltage is a percentage of said expected AC voltage of said high voltage input, and wherein said percentage is dependent upon said turn ratios of said winding segments.

9. The passive AC-DC converter of claim 8, wherein said stepped down voltage is determined with a step down ratio of $1 \geq \gamma \geq 0.5$.

10. The passive AC-DC converter of claim 9, wherein a relative power rating of the autotransformer is 51.9% for a step down ratio of $\gamma=0.9$.

11. The passive AC-DC converter of claim 1, wherein said autotransformer has at most 21 windings, and wherein said windings are configured such that a pulsed output current on each of nine phase outputs is converted to a near sinusoidal current waveform via eighteen steps at AC inputs.

12. The passive AC-DC converter of claim 11, wherein said autotransformer comprises three phases, and wherein seven of said at most twenty-one windings are on each of said phases.

13. The passive AC-DC converter of claim 1, further comprising:
a set of first switches connecting said plurality of first inputs to said autotransformer;
a set of second switches connected said plurality of second inputs to said autotransformer;
a controller controllably coupled to said first and second set of switches, wherein said controller is operable to prevent one of said first inputs and said second inputs from connecting to said autotransformer when the other of said first inputs and said second inputs is connected to said autotransformer.

14. The passive AC-DC converter of claim 13, wherein each of said switches in said set of first switches is a break-before-make switch, and wherein each of said switches in said set of second switches is a break-before-make switch.

15. A passive AC-DC converter comprising:
an autotransformer, wherein said autotransformer comprises:
a plurality of first high voltage AC inputs;
a plurality of second low voltage AC inputs;
a plurality of winding segments on each of multiple phase legs of said autotransformer, wherein each of said plurality of winding segments has a turn ratio normalized to a designated winding segment on said phase leg, and each phase leg of said autotransformer comprises a first winding segment having a turn ratio of 1, a second winding segment having a turn ratio of 1.690, a third winding segment having a turn ratio of 4.668, a fourth winding having a turn ratio of 3.926, a fifth winding segment having a turn ratio of 3.433, a sixth winding segment having a turn ratio of 3.572, and a seventh winding segment having a turn ratio of 3.177, for a step down ratio of 0.9;
wherein said plurality of winding segments on each phase leg of said autotransformer are configured such that each corresponding output of said nine-phase output is a stepped down voltage relative to an expected AC voltage of said high voltage input, wherein said stepped down voltage is a percentage of said expected AC voltage of said high voltage input, is determined with a step down ratio of $1 \geq \gamma \geq 0.5$, wherein, and is dependent upon said turn ratios of said winding segments;
a winding topology having a plurality of windings corresponding to each of multiple phases, said plurality of windings configured such that said autotransformer generates an 18-pulse AC input current waveform; and
a set of autotransformer outputs;
a bridge rectifier connected to said set of autotransformer outputs comprising a nine phase AC output; and
a DC output from said bridge rectifier.

* * * * *